(12) United States Patent
Liang et al.

(10) Patent No.: US 9,507,521 B2
(45) Date of Patent: Nov. 29, 2016

(54) INPUT APPARATUS, INPUT MODE SWITCHING METHOD AND COMPUTER APPARATUS

(71) Applicant: WISTRON CORP., New Taipei (TW)

(72) Inventors: Chen-Yi Liang, New Taipei (TW); Chu-Chia Tsai, New Taipei (TW); Cheng-Hsiang Chuang, New Taipei (TW)

(73) Assignee: WISTRON CORP., New Taipei (TW)

( * ) Notice: Subject to any disclaimer, the term of this patent is extended or adjusted under 35 U.S.C. 154(b) by 87 days.

(21) Appl. No.: 14/214,991

(22) Filed: Mar. 16, 2014

(65) Prior Publication Data
US 2015/0109237 A1    Apr. 23, 2015

(30) Foreign Application Priority Data
Oct. 23, 2013   (TW) .............................. 102138224 A

(51) Int. Cl.
*G06F 3/0488*  (2013.01)
*G06F 3/041*   (2006.01)

(52) U.S. Cl.
CPC ......... *G06F 3/04886* (2013.01); *G06F 3/0414* (2013.01)

(58) Field of Classification Search
CPC .......................... G06F 3/04886; G06F 3/0414
USPC .................................................. 345/156–184
See application file for complete search history.

(56) References Cited

U.S. PATENT DOCUMENTS

| | | | | |
|---|---|---|---|---|
| 6,128,007 A * | 10/2000 | Seybold | ............. | G06F 3/03545 345/174 |
| 6,323,846 B1 * | 11/2001 | Westerman | .......... | G06F 3/0235 345/173 |
| 2002/0057259 A1 * | 5/2002 | Suzuki | .................. | G06F 3/0489 345/168 |
| 2008/0007532 A1 * | 1/2008 | Chen | ..................... | G06F 3/0414 345/173 |
| 2009/0213066 A1 * | 8/2009 | Hardacker | .............. | G06F 3/016 345/156 |
| 2013/0249860 A1 * | 9/2013 | Seo | ......................... | G06F 3/045 345/174 |
| 2013/0307816 A1 * | 11/2013 | Lee | ....................... | G06F 1/1652 345/174 |
| 2014/0085254 A1 * | 3/2014 | Tenuta | .................. | G06F 3/0414 345/174 |
| 2015/0084868 A1 * | 3/2015 | Tenuta | .................. | G06F 3/0213 345/168 |
| 2015/0185946 A1 * | 7/2015 | Fourie | .................. | G06F 3/0416 345/174 |

FOREIGN PATENT DOCUMENTS

| | | |
|---|---|---|
| CN | 102354269 B | 2/2012 |
| TW | 201224876 A1 | 6/2012 |

OTHER PUBLICATIONS

Taiwan Patent Office, Office action issued on Jul. 24, 2015.

* cited by examiner

*Primary Examiner* — Dmitriy Bolotin
(74) *Attorney, Agent, or Firm* — Li & Cai Intellectual Property (USA) Office

(57) ABSTRACT

The present disclosure provides an input apparatus, which is coupled to a handheld electronic device. The input apparatus includes a touchpad and a processing unit. The touchpad includes a button region having a plurality of virtual buttons defined therein. The touchpad is used for sensing a touch gesture of a user over the button region and correspondingly generating a touch coordinate data and a touch pressure value. The processing unit is coupled to the touchpad. The processing unit determines whether to cause the handheld electronic device to enter a keyboard mode or a cursor control mode according to the touch pressure value. When the input apparatus operates in the keyboard mode, the processing unit outputs a button signal to the handheld electronic device. When the input apparatus operates in the cursor control mode, the processing unit outputs a cursor control signal to the handheld electronic device.

16 Claims, 7 Drawing Sheets

INPUT APPARATUS, INPUT MODE SWITCHING METHOD AND COMPUTER APPARATUS

BACKGROUND

1. Technical Field

The present disclosure relates to an input apparatus, an input mode switching method, and a computer apparatus, in particular, to an input apparatus, an input mode switching method, and a computer apparatus for a handheld electronic device.

2. Description of Related Art

As technology advances, handheld electronic devices, such as smart phones, tablets, and laptops have been used widely in today's society. To increase user's convenience for operating the handheld electronic device (e.g., inputting characters or controlling the movement of a cursor displayed), handheld electronic devices (such as the laptops) generally equipped with a built-in a keyboard and/or a touchpad to assist the operation. Other handheld electronic device (such as the smart phone and the laptop computer) can be configured to externally connect an input apparatus having keyboard and/or touchpad functions (e.g., foldable type covers or foldable touch covers).

However, because signals outputted by the keyboard and the touchpad for controlling the cursor are different, therefore the keyboard and the touchpad for controlling the cursor are to be arranged and disposed in different regions, the modern input apparatus either separately placing the keyboard and the touch pad or designed to only has keyboard to comply with the miniature trend. The input apparatus having keyboard only can only provide keyboard functionality thus cannot enable user to efficiently operate the handheld electronic device. Moreover, the input apparatus having both the button region and the touchpad for controlling the cursor would require more space, which does not comply with the miniature trend

SUMMARY

Accordingly, exemplary embodiments of the instant disclosure provide an input apparatus, an input mode switching method, and a computer apparatus. The input apparatus can integrate a keyboard region and a cursor control region into one signal region and the input apparatus is operable to automatically switch between a keyboard mode and a cursor mode according to a touch gesture made by a user over a touchpad, thereby achieving dual-input control mode. Accordingly, the input apparatus, the input mode switching method, and the computer apparatus can effectively enhance the user's operating convenience.

An exemplary embodiment of the instant disclosure provides an input apparatus. The input apparatus is coupled to a handheld electronic device. The input apparatus includes a touchpad and a processing unit. The touchpad is coupled to the processing unit. The touchpad has a button region defined thereon. The button region has a plurality of virtual buttons defined therein. The touchpad is configured for operatively sensing a touch gesture made by a user over the button region, and correspondingly generating a touch coordinate data and a touch pressure value. The processing is configured to operatively determine whether to cause the input apparatus to enter a keyboard mode or a cursor mode according to the touch pressure value. When the input apparatus operates in the keyboard mode, the processing unit outputs a button signal to the handheld electronic device. When the input apparatus operates in the cursor mode, the processing unit outputs a cursor control signal to the handheld electronic device.

According to one exemplary embodiment of the instant disclosure, when the processing unit determines that the touch pressure value lies within a first predefined pressure range, the processing unit causes the input apparatus to enter the cursor mode. When the processing unit determines that the touch pressure value lies within a second predefined pressure range, the processing unit causes the input apparatus to enter the keyboard mode. The upper limit of the first predefined pressure range is less than the lower limit of the second predefined pressure range.

When the processing unit determines that the touch pressure value lies outside the first predefined pressure range or the second predefined pressure range, the processing unit does not output any signal to the handheld electronic device.

An exemplary embodiment of the instant disclosure provides a computer apparatus. The computer apparatus includes a touchpad and a handheld electronic device. The touchpad is coupled to the handheld electronic device. The touchpad has a button region defined thereon and the button region has a plurality of virtual buttons defined therein. The touchpad is configured for operatively sensing a touch gesture made by a user over the button region, and correspondingly generating a touch coordinate data and a touch pressure value. The handheld electronic device includes a processing unit coupled to the touchpad. The processing unit is configured to operatively determine whether the touch coordinate data corresponds to a button signal or a cursor control signal according to the touch pressure value and whether to display a character on the handheld electronic device or to control the cursor operation on the handheld electronic device.

An exemplary embodiment of the instant disclosure provides an input mode switching method. The input mode switching method is adapted for an input apparatus, wherein the input apparatus is coupled to a handheld electronic device. The input mode switching method includes the following steps. A plurality of virtual buttons arranged in a button region on a touchpad is scanned to sense a touch gesture made by a user over the button region. Next, a touch coordinate data and a touch pressure value are generated corresponding to the touch gesture based on a detection result. Whether to cause the input apparatus to enter a keyboard mode or a cursor mode is determined according to the touch pressure value. When the input apparatus operates in the keyboard mode, the input apparatus outputs a button signal to the handheld electronic device. When the input apparatus operates in the cursor mode, the input apparatus outputs a cursor control signal to the handheld electronic device.

To sum up, exemplary embodiments of the instant disclosure provide an input apparatus, an input mode switching method, and a computer apparatus. The input apparatus can automatically switch and operate between the keyboard mode and the cursor mode according to the touch gesture made by the user over the virtual buttons defined in the button region to correspondingly control the operation of the handheld electronic device. The input apparatus of the instant disclosure can automatically determine the input mode of the input apparatus according to the pressure of the touch gesture made by the user, thereby achieve the objective of integrating the button region with the cursor control region. Accordingly, the input apparatus, the input mode switching method, and the computer apparatus can enhance the user's operating convenience while effectively reduce the area needed as well as and lower the associated production cost.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
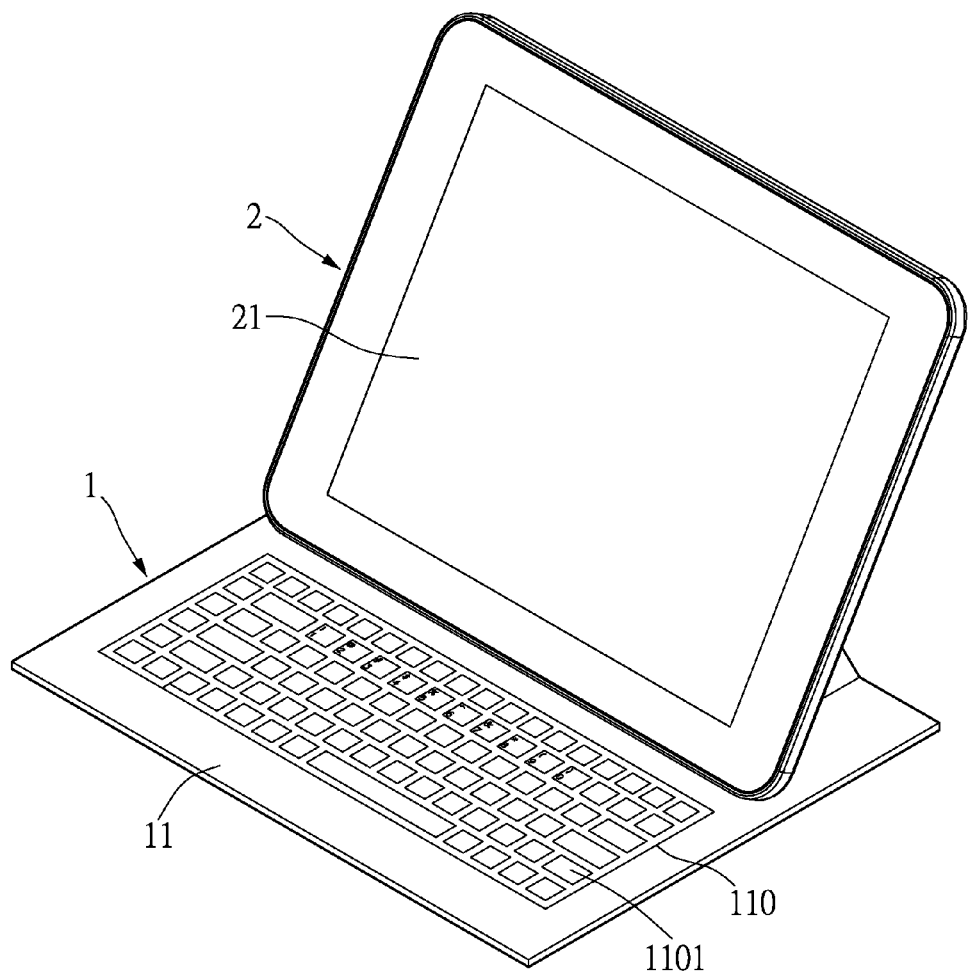
FIG. 1A is a diagram illustrating an input apparatus according provided to an exemplary embodiment of the instant disclosure.

Reference will now be made in detail to the exemplary embodiments of the present disclosure, examples of which are illustrated in the accompanying drawings. Wherever possible, the same reference numbers are used in the drawings and the description to refer to the same or like parts.

[An Exemplary Embodiment of Input Apparatus]

Figure 1B:
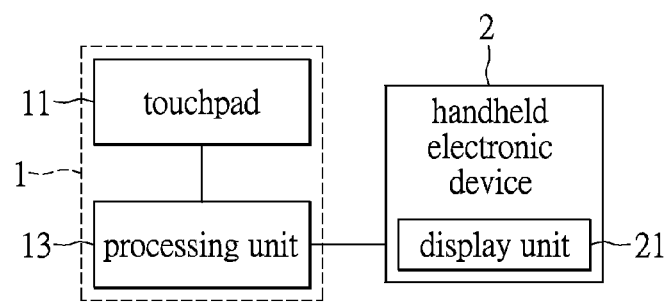
FIG. 1B is a block diagram illustrating the input apparatus provided according to the exemplary embodiment of the instant disclosure.

Please refer to FIGS. 1A and 1B, FIG. 1A shows a diagram illustrating an input apparatus provided according to a an exemplary embodiment of the instant disclosure and FIG. 1B shows a block diagram illustrating the input apparatus provided according to the exemplary embodiment of the present disclosure. The input apparatus 1 is coupled to the handheld electronic device 2. The input apparatus 1 is configured as an input interface of the handheld electronic device 2 for assisting a user in operating the handheld electronic device 2, such as inputting characters or controlling the cursor, and the like.

As shown in FIG. 1A, the handheld electronic device 2 has a display unit 21 for displaying the screen. The handheld electronic device 2, for example, may be a smart phone, a tablet, a laptop computer and the like and the instant disclosure is not limited thereto. For an illustration, the handheld electronic device 2 herein is a tablet as shown in FIG. 1A.

Simply speaking, the input apparatus 1 has a keyboard mode and a cursor mode. The input apparatus 1 can determine whether to cause the input apparatus 1 to enter the keyboard mode or the cursor mode according to the touch pressure generated as the user touching the input apparatus 1. Specifically, the input apparatus 1 has a pressure sensing capability and can automatically switch and operate between the keyboard mode and the cursor mode according to the touch pressure generated as the user touching the input apparatus 1.

While operates in the keyboard mode, the input apparatus 1 outputs a button signal to the handheld electronic device 2 according to a touch position made by the user to drive the display unit 21 of the handheld electronic device 2 to correspondingly display a character on the screen generated. While operates in the cursor mode, the input apparatus 1 outputs a cursor control signal to the handheld electronic device 2 according to the touch position and a slide trace made by the user to control the operation of a cursor displayed on the screen generated by the display unit 21 of the handheld electronic device 2.

Specifically, the input apparatus 1 includes a touchpad 11 and a processing unit 13. The touchpad 11 is coupled to the processing unit 13. The handheld electronic device 2 includes the display unit 21. The processing unit 13 is coupled to the handheld electronic device 2.

The touch pad 11 includes a button region 110 having a plurality of virtual buttons 1101 defined therein. The virtual buttons 1101 is configured for operatively sensing a touch gesture (e.g., pressing, clicking, sliding, and the like) made by the user over the button region 110 and correspondingly generating a touch coordinate data and a touch pressure value to the processing unit 13.

It is worth to note that the virtual buttons 1101 can include character buttons or function buttons and can be configured according to the operational and/or design requirements of the touch pad 11. The definition or description for the virtual buttons 1101 can be indicated or marked with labels and the labels can be attached via adhesive, hot pressing process, or screen printing process and the instant disclosure is not limited to the exampled provided herein.

The processing unit 13 operatively determines whether to cause the handheld electronic device 1 to enter a keyboard mode or a cursor mode according to the touch pressure value. When the processing unit 13 determines to cause the input apparatus 1 to enter and operate in the keyboard mode according to the touch pressure value, the processing unit 13 outputs the button signal to the handheld electronic device 2 to cause the display unit 21 to correspondingly display on the screen generated such as inputting a character or executing a specific function associated with the function buttons. When the processing unit 13 determines to cause the input apparatus 1 to enter and operate in the cursor mode according to the touch pressure value, the processing unit 13 outputs a cursor control signal to the handheld electronic device 2 to correspondingly control the operation of cursor displayed on the screen generated by the display unit 21.

Specifically, when the processing unit 13 determines that the touch pressure value lies within a first predefined pressure range (e.g., 5 g~20 g), the processing unit 13 operatively causes the input apparatus 1 to enter the cursor mode and outputs the cursor control signal to the handheld electronic device 2. The cursor control signal comprises of a click signal or a slide signal.

When the processing unit 13 enters the cursor mode and determines that the user operates the cursor to implement a click operation according to the touch coordinate data associated with the touch gesture, the processing unit 13 outputs the click signal to the handheld electronic device 2 to correspondingly implement the click operation on the screen generated by the display unit 21 of the handheld electronic device 2. When the processing unit 13 enters the cursor mode and determines that the touch gesture made by the user is a slide gesture according to the touch coordinate data associated with the touch gesture, the processing unit 13 outputs the slide signal to the handheld electronic device 2 to control the cursor operation on the handheld electronic device 2. The processing unit 13 can operatively record and generate the trace data according to the touch coordinate data and outputs the slide signal to control the cursor operation on the handheld electronic device 2 according to the trace data.

When the processing unit 13 determines that the touch pressure value corresponding to the touch gesture lies within a second predefined pressure range (e.g., 60 g~100 g), the processing unit 13 operatively causes the input apparatus 1 to enter the keyboard mode and correspondingly outputs the button signal to the handheld electronic device 2. The button signal can comprise of a character signal or a function signal depending upon the functionalities of that the keyboard has.

When the processing unit 13 enters the keyboard mode, the processing unit 13 operatively determines whether the virtual button 1101 touched by the user is a character button or a function button according to the touch coordinate data associated with the touch gesture. When the processing unit 13 determines that the virtual button 1101 touched by the user is the character button, the processing unit 13 outputs the character signal to the handheld electronic device 2, to cause the handheld electronic device 2 to display the character associate with the character button. When the processing unit 13 determines that the virtual button 1101 touched by the user is the function button, the processing unit 13 outputs the function signal to the handheld electronic device 2 to cause the handheld electronic device 2 to implement a specific function associate with the function button, such as converting characters between uppercase and lowercase, implementing print screen operation, adjusting volume and the like, Thus, the input apparatus 1 can implement the keyboard mode and the cursor mode on a single touchpad. The input apparatus 1 can operative determine the input mode of the input apparatus 1 and correspondingly control the operation of the handheld electronic device 2 by sensing the touch gesture made by the user over the button region 110 defined on the touchpad 11.

It is worth to note that, since the touch pressure value generated as the user pressing the virtual button 1101 in the button region 110 is generally much larger than the touch pressure value generated as the user clicking on or sliding on the virtual button 1101, therefore the second predefined pressure range is configured to be greater than the first predefined pressure range.

Moreover, the first predefined pressure range and the second predefined pressure range may be respectively configured according to the gravitational acceleration generated as the user touches or presses the virtual buttons 1101 defined in the button region and/or the practical operation of the touchpad 11 and the instant disclosure is not limited thereto. The first predefined pressure range and the second predefined pressure range may be pre-stored in the processing unit 13 or a built-in memory (not shown) of the handheld electronic device 2 via firmware writing or burning operations.

In the instant embodiment, the upper limit of the first predefined pressure range is less than the lower limit of the second predefined pressure range. The lower limit of the first predefined pressure range is configured to be 5 g and the upper limit of the first predefined pressure range is configured to be 20 g. The lower limit of the second predefined pressure range is configured to be 60 g, and the upper limit of the second predefined pressure range is configured to be 100 g.

Figure 2A:
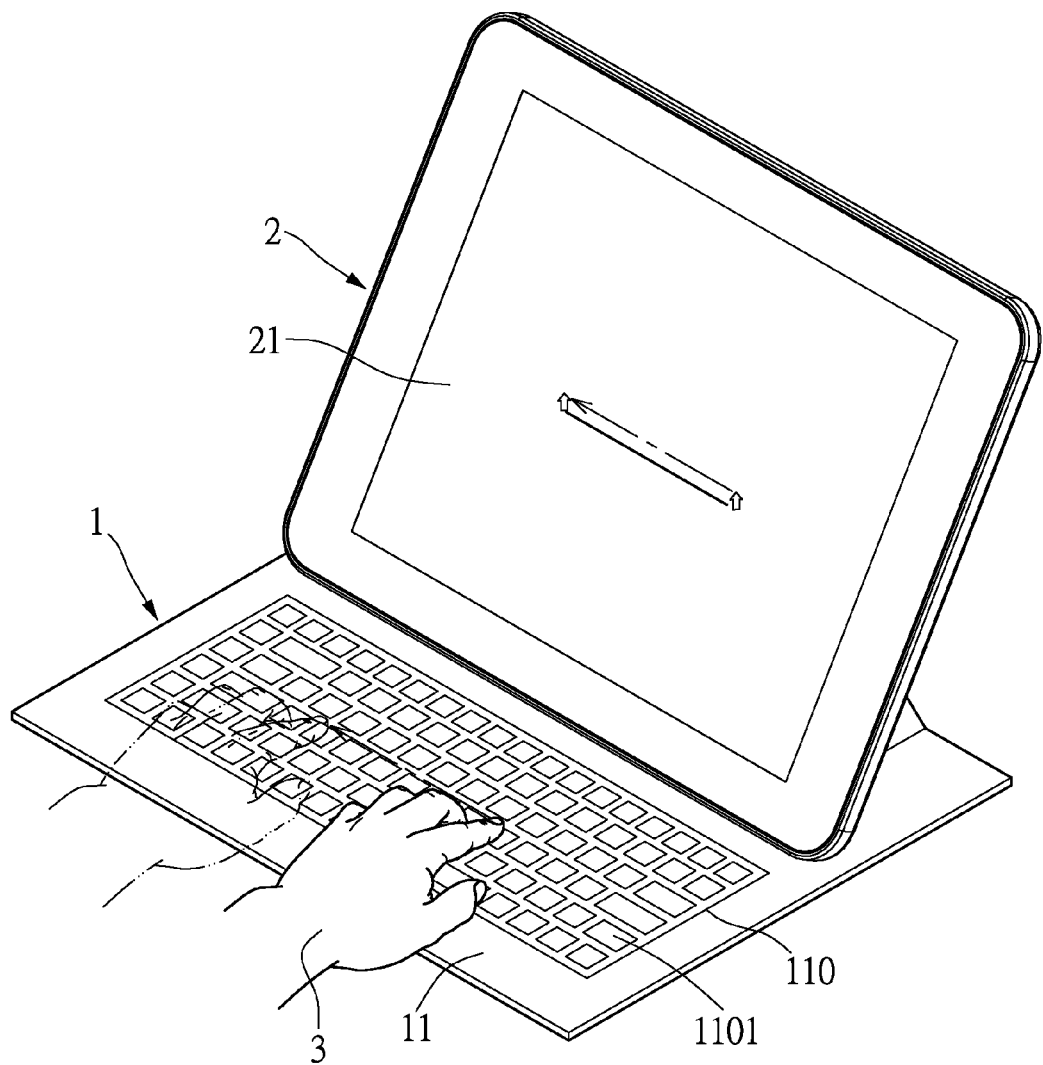
FIGS. 2A-2B respectively are diagrams illustrating an operation of the input apparatus provided according to the exemplary embodiment of the instant disclosure.

For example, please refer to FIG. 2A in conjunction with FIG. 1B. FIG. 2A shows a diagram illustrating an operation of the input apparatus provided according to the exemplary embodiment of the instant disclosure. When the user does a slide gesture (not shown in FIG. 2A) over the button region 110 with hand 3, the virtual button 1101 defined on the touchpad 11 of the input apparatus 1 operatively senses and recognizes that the touch gesture made by the hand 3 is the slide gesture, and the touchpad 11 outputs the touch pressure value and the touch coordinate data to the processing unit 13 responsive to the slide gesture.

The processing unit 13 then causes the input apparatus 1 to enter and operate in the cursor mode according to the touch pressure value. The touch pressure value generate responsive to the slide gesture lies within the first predefined pressure range such as 5 g~20 g, wherein "g" is a gravitational unit. The processing unit 13 then instantly records and generates the trace data associated with the operation of hand 3 made on the input apparatus 1 according to the touch coordinate data so as to generate the slide signal to the handheld electronic device 2 and control the cursor operation on the handheld electronic device 2. The slide signal is the cursor control signal that contains touch coordinate data associated with the virtual buttons 1101 being touched. Accordingly, the cursor displayed on the screen generated by the display unit 21 moves along with the trace data generated responsive to the slide movement of the hand 3.

Moreover, when the touchpad 11 senses and recognizes that the touch gesture made by the hand 3 is the click gesture while the touch pressure value lies within the touch pressure range corresponding to clicking or sliding operation (e.g., 5 g~20 g), the processing unit 13 operatively outputs the click signal to the handheld electronic device 2 according to the touch coordinate data associated with the click position to cause the handheld electronic device 2 to execute the click operation. That is, the click signal is the cursor control signal containing the touch coordinate data associated with the particular virtual button 1101 touched.

Figure 2B:
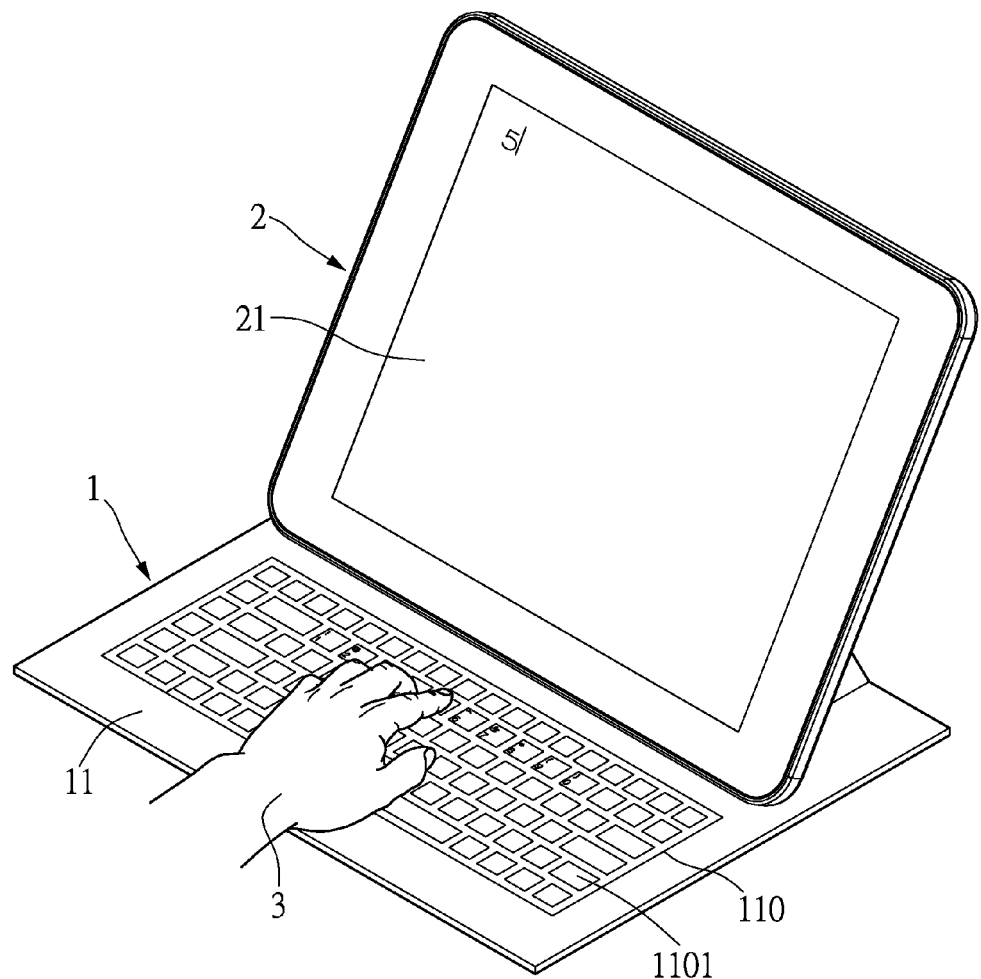

For another example, please refer to FIG. 2B in conjunction with FIG. 1B. FIG. 2B shows a diagram illustrating another operation of the input apparatus provided according to the exemplary embodiment of the instant disclosure. As shown in FIG. 2B, the user can input a character by pressing any one of the virtual buttons 1101 defined in the button region 110 (e.g., the virtual button "5") with the hand 3. The touchpad 11 of the input apparatus 1 then senses and determines that the touch gesture made by the hand 3 is the press gesture and correspondingly generates the touch coordinate data and the touch pressure value sensed associated with the virtual buttons 1101 (i.e., the virtual button "5") to the processing unit 13.

The processing unit 13 determines to cause the input apparatus 1 to enter and operate in the keyboard mode according the touch pressure value, wherein the touch pressure value responsive to the press gesture lies within the second predefined pressure range (e.g., 60 g~100 g). The processing unit 13 outputs the button signal to the handheld electronic device 2, wherein the button signal contains the touch coordinate data associated with the position of the touched virtual button 1101 (e.g. the virtual button "5"). The handheld electronic device 2 displays the character corresponding to the virtual button 1101 (e.g. the virtual button "5") touched on the screen which is generated by the display unit 21.

When the processing unit 13 determines that the touch pressure value lies neither in the first predefined pressure range (e.g., 5 g~20 g) nor the second predefined pressure range (e.g., 60 g~100 g), the processing unit 13 determines that the user is not operating with the touchpad 11. The processing unit 13 does not output any signal to the handheld electronic device 2 to prevent false operation thereby, enhance the operation efficiency of the input apparatus 1.

Accordingly, the input apparatus 1 of the instant embodiment can automatically switch between the keyboard mode and the cursor mode according to the touch gesture made by the user over the virtual buttons 1101 of the button region 110, and achieve the objective of dual-input control mode, thereby enhance practicality and convenience of the input apparatus 1.

In practice, the processing unit 13, for example, may be implemented by a processing chip including but not limited to a microcontroller, an embedded controller, which is integrated in the input apparatus 1 and programmed with the necessary firmware for executing the algorithm of sensing the touch gesture made by the user, and causing the input apparatus to operatively switch between the keyboard mode and the cursor mode to correspondingly generate the button signal and the cursor control signal, however, the instant disclosure is not limited thereto.

In one embodiment, the processing unit 13 may utilize the general purpose input (GPI) of the microcontroller or the embedded controller to receive the detecting signal corresponding to the touch coordinate data and the touch pressure value which is outputted by the touchpad 11 and correspondingly control the operation of the handheld electronic device 2.

The input apparatus 1 can be configured to connect the handheld electronic device 2 in wired manner (e.g., via universal serial bus (USB)) and transmit the button signal or the cursor control signal to the handheld electronic device 2. The input apparatus 1 can also be configured to connect the handheld electronic device 2 in wireless manner (e.g., via Bluetooth). In other words, t the input apparatus 1 can connect to the handheld electronic device 2 in wire or wireless manner depend upon to exact structure, exact type, and actual implementation associated with the input apparatus 1 and the handheld electronic device 2, and the instant disclosure is not limited thereto.

It shall be noted that, FIGS. 2A and 2B merely serve to respectively an operation of the input apparatus 1 and the instant disclosure is not limited thereto. The actual implementation, the exact size, and the keyboard design associated with the touchpad 11 can be configured by the actual operation and/or the design requirement, and the instant disclosure is not limited thereto. Or equivalently, the instant embodiment does not limit the exact type, the exact structure, and the actual implementation of the touchpad 11 and the processing unit 13 of the input apparatus 1.

Figure 3:
FIG. 3 is a diagram illustrating the structure of a touchpad provided according to the exemplary embodiment of the instant disclosure.
Figure 4:
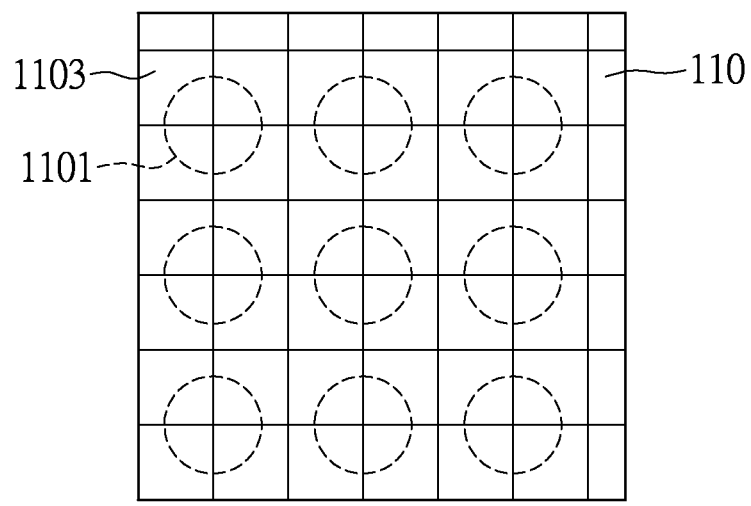
FIG. 4 is a diagram illustrating a portion of a touch sensing circuit provided according to the exemplary embodiment of the instant disclosure.

The instant embodiment further provides the structure of the touchpad. Please refer to FIG. 3 and FIG. 4 in conjunction with FIG. 1B. FIG. 3 shows a diagram illustrating the structure of a touchpad provided according to first exemplary embodiment of the instant disclosure. FIG. 4 shows a diagram illustrating a portion of a touch sensing circuit provided according to the exemplary embodiment of the instant disclosure. As shown in FIG. 3, in the instant embodiment, the touchpad 11 includes a substrate 111, a first conductive layer 113, a pressure sensing layer 115, a second conductive layer 117, and a protection layer 119.

The substrate 111 serve as a base of the touchpad 11 and the substrate 111 has a button region defined therein. The substrate 111 may be implemented by a transparent or an opaque insulation material. The material of substrate 111, for example, can comprise of polyethylene terephthalate (PET), polycarbonate (PC), cycloolefin polymer (COP), tricellulose acetate (TCA), ployethersulfone (PES), polyolefin (PO), polymethylmethacrylate (PMMA), or combination thereof, and the instant disclosure is not limited thereto.

The first conductive layer 113 (e.g., the lower conductive layer) is disposed on the substrate 111. The first conductive layer 113 has a plurality of first sensing regions (not shown). The pressure sensing layer 115 is disposed on the first conductive layer 113. The second conductive layer 117 (e.g., the upper conductive layer) is disposed on the pressure sensing layer 115. The second conductive layer 117 has a plurality of second sensing regions disposed in correspondence to the first sensing regions (not shown). The protection layer 119 is disposed on the second conductive layer 117 for protecting the structure of the touchpad 11. Labels associated with the virtual buttons 1101 can be disposed on the protection layer 119 via adhesive, hot pressing process, or screen printing process to provide as reference to the user.

The first sensing regions and the second sensing regions respectively have a plurality of the sensing units 1103 defined therein. The processing unit 13 generates the touch coordinate data and the touch pressure value according to signals outputted from each sensing unit 1103.

Specifically, the processing unit 13 is electrically connected to the sensing units 1103. The processing unit 13 operatively detects the variation in the resistance or the variation in the capacitance between the first conductive layer 113 and the second conductive layer 117 according to signals outputted from each sensing unit 1103 on the first conductive layer 113 and signals outputted from each respective sensing unit 1103 on the second conductive layer 117. Such that the processing unit 13 can determine the touch pressure value and the associated touch coordinate data outputted by the sensing units 1103.

Next, the processing unit 13 may utilize the sensing units 1103 to define the virtual buttons 1101. For example, as shown in FIG. 4, the processing unit 13 may use four sensing units 1103 to define a single virtual button. Then the processing unit 13 can generate the touch coordinate data and the touch pressure value responsive to the touch gesture according to at least one signal outputted from the four sensing units 1103. Those skilled in the art shall know the number of the sensing units 1103 used to define the virtual buttons can be configured through the processing unit 13 according to the detection requirements and the actual structure of the touchpad 11, or the resolution of the virtual button 1101 required. Hence, FIG. 4 is merely used as an illustration for describing the arrangement of the sensing units 1103 on the first and the second conductive layers 113, 117 and the circuitry layout for the virtual button, and the instant embodiment is not limited thereto.

In practice, the sensing units 1103 in the first sensing region and the second sensing regions can be formed on the first conductive layer 113 and the second conductive layer 117 by disposing the mask patterned with the required layout circuit and implementing process such as photolithography, laser ablation, or screen-printing. The shape of first sensing region and the second sensing region may be configured to be a polygon region including but not limited to square, rectangle, rhombus, triangle, hexagon, octagon depend upon an exact circuit design and the instant embodiment is not limited thereto.

The pressure sensing layer 115 can implemented by using the epitaxial growth or chemical vapor deposition (CVD) technique to deposit graphene on the first conductive layer 113 forming a graphene layer. The protection layer 119 may be a plastic film, which can be deposited on the second conductive layer 117 using the CVD technique and attach the labels corresponding to the virtual buttons 1101 on the protection layer 119 via printing, screen printing, adhesive method, or the like.

It is worth to note that the touchpad 11 has the functionality of sensing and determining the touch gesture made by the user and operative to only output the button signal or the cursor control signal to the handheld electronic device 2. Specifically, the handheld electronic device 2 does not have to process or analyze the touch gesture as well as does not need to identify the virtual buttons 1101 defined the button region on the touchpad 11. Therefore, does not increase the computation or signal processing loading on the handheld electronic device 2. Moreover, the touchpad 11 can also be adapted to and comply with any type of the handheld electronic devices.

It shall be noted that FIG. 3 and FIG. 4 merely serve to illustrate an implementation of structure and the instant disclosure is not limited thereto.

[An Exemplary Embodiment of Computer Apparatus]

In the above embodiment, operations of sensing and analyzing the touch coordinate data and the touch pressure value generated in responsive to the touch gesture made by the user over the button region is performed by the input apparatus. The input apparatus further converts the sensing result into signals for controlling the handheld electronic device. However, in practice, the input apparatus may be configured to only sense the touch gesture made by the user over the button region and outputs the sensing results to the handheld electronic device for analyzation.

More specifically, the instant embodiment provides a computer apparatus. The computer apparatus includes a touchpad and a handheld electronic device. The touchpad is coupled to the handheld electronic device.

The touchpad includes a button region which has a plurality of virtual buttons defined therein. The touchpad is used for sensing a touch gesture made by a user over the button region and generating a touch coordinate data and a touch pressure value responsive to the touch gesture. The structure and the operation associated with the touchpad are essentially the same as the touchpad 11 shown in FIG. 1B. Those skilled in the art shall be able to infer the structure of the touchpad and the operation method of the touchpad in the computer apparatus based on the above elaborations, and further descriptions are hereby omitted.

In the instant embodiment, the handheld electronic device may be for example, a smart phone, tablet, laptop computer, or the like and the instant disclosure is not limited thereto. The handheld electronic device includes a processing unit and a display unit. The processing unit is coupled to the display unit. The processing unit is configured to operatively determine whether the touch coordinate data corresponds to a button signal or a cursor control signal according to the touch pressure value for correspondingly control the operation of the handheld electronic device.

When the processing unit determines that the touch coordinate data corresponds to the button signal according to the touch pressure value, the processing unit causes the display unit of the handheld electronic device to corresponding display a character. When the processing unit determines that the touch coordinate data corresponds to the cursor control signal according to the touch pressure value, the processing unit controls the operation of the cursor on the screen generated by the display unit.

In the instant embodiment, the touchpad is only used for sensing the touch gesture and generating the touch coordinate data and the touch pressure value responsive to the touch gesture. Operations such as determining whether the signal outputted by the touch pad is a button signal or cursor control signal and controlling the operation of the handheld electronic device are performed by a build-in processing unit in the handheld electronic device. The processing unit, for example, may be implemented by a processing chip built-in in the handheld electronic device. The process chip can include but not limited to a microcontroller, an embedded controller, which has the necessary firmware programmed therein for implementation algorithms of determining the button signal or the cursor control signal, and correspondingly controls the operation of the handheld electronic device.

[An Exemplary Embodiment of Input Mode Switching Method]

Figure 5:
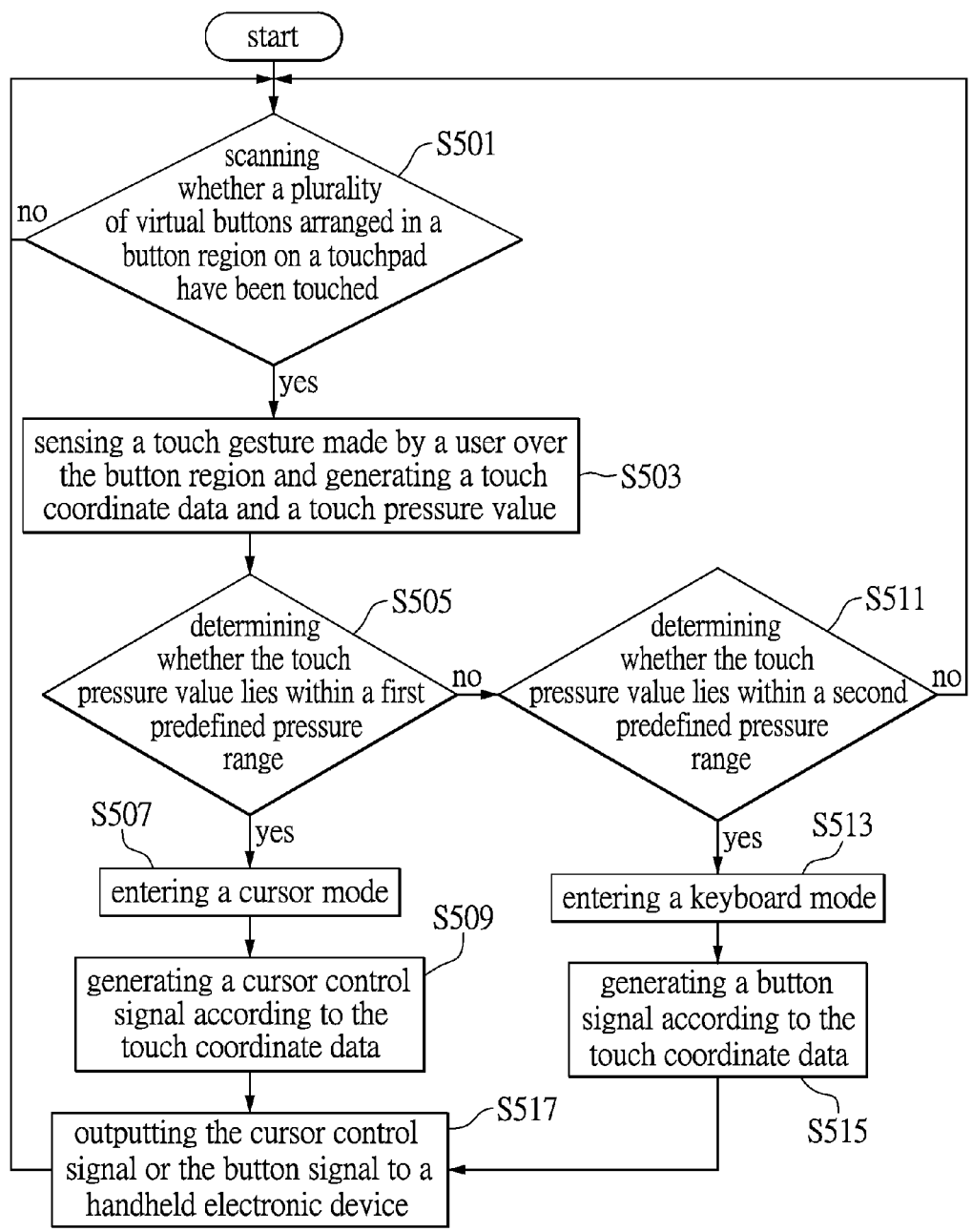
FIG. 5 is a flowchart illustrating an input mode switching method according provided to an exemplary embodiment of the instant disclosure.

Based on the aforementioned embodiment, the present disclosure may generalize an input mode switching method, which can be adapted for the input apparatus of the aforementioned embodiment. Please refer to FIG. 5 in conjunction with FIGS. 1B, 2A, and 2B. FIG. 5 shows a flowchart illustrating an input mode switching method provided according to an exemplary embodiment of the instant disclosure. The method in FIG. 5 can be implemented by writing corresponding firmware in the processing unit 13 of the input apparatus 1.

In Step S501, the processing unit 13 drives the touchpad 11 to scan whether a plurality of virtual buttons 1101 defined in a button region 110 on the touchpad 11 have been touched. When the processing unit 13 determine that one or more virtual buttons 1101 defined in the button region 110 on the touchpad 11 have been touched, executing Step S503. Conversely, when the processing unit 13 determines that the virtual buttons 1101 defined in the button region 110 on the touchpad 11 have not been touched, returns to Step S501.

Specifically, the touchpad 11 can sequentially generate sensing signals after scanning the virtual buttons 1101. The processing unit 13 can determine whether the virtual buttons 1101 have been touched based on the sensing signals received (e.g., determining whether the voltage variation of the sensing signals is greater than a preset voltage).

In Step S503, the touchpad 11 senses a touch gesture made by a user over the button region 110 and generates a touch coordinate data and a touch pressure value responsive to the touch gesture. The touchpad 11 simultaneously outputs the touch coordinate data and the touch pressure value to the processing unit 13.

Next, in Step S05, the processing unit 13 determines whether the touch pressure value lies within a first predefined pressure range. The first predefined pressure range may be defined by the gravitational acceleration generated as the user touches or presses the virtual buttons 1101. In the instant embodiment, the first predefined pressure range is configured to be from 5 g to 20 g. When the processing unit 13 determines that the touch pressure value lies within the first predefined pressure range, execute Step S507. Conversely, when the processing unit 13 determines that the touch pressure value lies outside the first predefined pressure range, executes Step S509.

In Step S507, the processing unit 13 causes the input apparatus 1 to enter a cursor mode. For example, when the touch pressure value responsive to the touch gesture made by the user is determined to be 10 g, the processing unit 13 operatively causes the input apparatus 1 to enter and operate in the cursor mode. For another example, when the touch pressure value responsive to the touch gesture made by the user is determined to be 65 g, the processing unit 13 then determines that the touch pressure value lies outside the first predefined pressure range, and executes Step S511.

In Step S509, the processing unit 13 calculates the cursor position based on the touch coordinate data in the cursor mode and generates the cursor control signal.

The cursor control signal comprises of a click signal or a slide signal (as shown in FIG. 2A). Specifically, when the touch gesture is the click gesture (as shown in FIG. 2A), the processing unit 13 determines to cause the input apparatus 1 to enter the cursor mode and generates the click signal corresponding to the click position for executing a click operation on the screen, which is generated by the display unit 21 of the handheld electronic device 2. When the touch gesture is the slide gesture, the processing unit 13 operatively records and generates a trace data corresponding to the touch gesture according to touch coordinate data received and outputs the slide signal to control the display unit 21 to correspondingly display the movement of the cursor on the screen generated.

In Step S511, the processing unit 13 determines that the touch pressure value lies within the second predefined pressure range. The second predefined pressure range can be defined by the gravitational acceleration generated as the user touches or presses the virtual buttons 1101 (as shown in FIG. 2B). In the instant embodiment, the second predefined pressure range is configured to be from 60 g to 100 g. When the processing unit 13 determines that the touch pressure value (e.g., 70 g) lies within the second predefined pressure range, executes Step S513. On the other hand, when the processing unit 13 determines that the touch pressure value lies outside the second predefined pressure range, the processing unit 13 determines to be the operation is the false operation and returns to Step S501.

In other words, when the processing unit 13 determines that the touch pressure value lies neither in the first predefined pressure range nor the second predefined pressure range, i.e., the touch pressure value lies within, for example, 0 g~4 g, 21 g~59 g, or more than 100 g, the processing unit 13 determines that the touch gesture is the false operation and does not output any signal to the handheld electronic device 2.

In Step S13, the processing unit 13 causes the input apparatus 1 to enter a keyboard mode. In Step S15, the processing unit 13 generates a button signal according to the touch coordinate data. Accordingly, the button signal corresponds to the position of the virtual buttons 1101 on the touchpad 11 touched. The button signal can comprises of a character signal or a function signal. More specifically, when the touched virtual buttons 1101 is determined to a character button, the processing unit 13 outputs the character signal corresponding to the position of the virtual buttons 1101 touched, so as to cause the display unit 21 of the handheld electronic device 2 to correspondingly display the character corresponding to the virtual buttons 1101 on the screen generated When the touched virtual buttons 1101 is the function button, the processing unit 13 outputs the function signal corresponding to the position of the virtual buttons 1101, to drive the handheld electronic device 2 to execute the specific function, such as volume adjusting operation, power control operation, print-screen operation, deleting characters, or the like. The specific function can be configured depend upon the function assigned to the virtual button defined on the touchpad 11 and the exact type and the operational requirements of the handheld electronic device 2 and the instant disclosure is not limited thereto.

In Step S517, the processing unit 13 outputs the cursor control signal or the button signal to the handheld electronic device 2 via wired or wireless transmission to control the operation of the handheld electronic device 2. For example, the processing unit 13 may transmit the button signal or the cursor control signal to the handheld electronic device 2 via the wired transmission, such as USB transmission. For another example, the processing unit 13 may transmit the button signal or the cursor control signal to the handheld electronic device 2 via wireless transmission, such as the Bluetooth transmission.

It is worth to note that the execution of the input mode switching method can be adjusted and configured according to the structure and operation of the input apparatus in FIG. 5. Specifically, when the input mode switching method in FIG. 5 is adopted by the aforementioned computer apparatus. Step S501~S503 can be executed by an external-connected touchpad driven by the built-in processing unit of the handheld electronic device. Step S505~S515 can be executed by the built-in processing unit upon receiving the touch coordinate data and the touch pressure value from the touchpad. The built-in processing unit in the handheld electronic device can determine the processing method of the touch coordinate data after determined whether the touch coordinate data corresponds to the button signal or the cursor control signal, so as to correspondingly control the operation of the handheld electronic device.

It shall be not that FIG. 5 is merely used to describe the input mode switching method for the input apparatus and the instant disclosure is not limited thereto.

[Another Exemplary Embodiment of Input Mode Switching Method]

Figure 6:
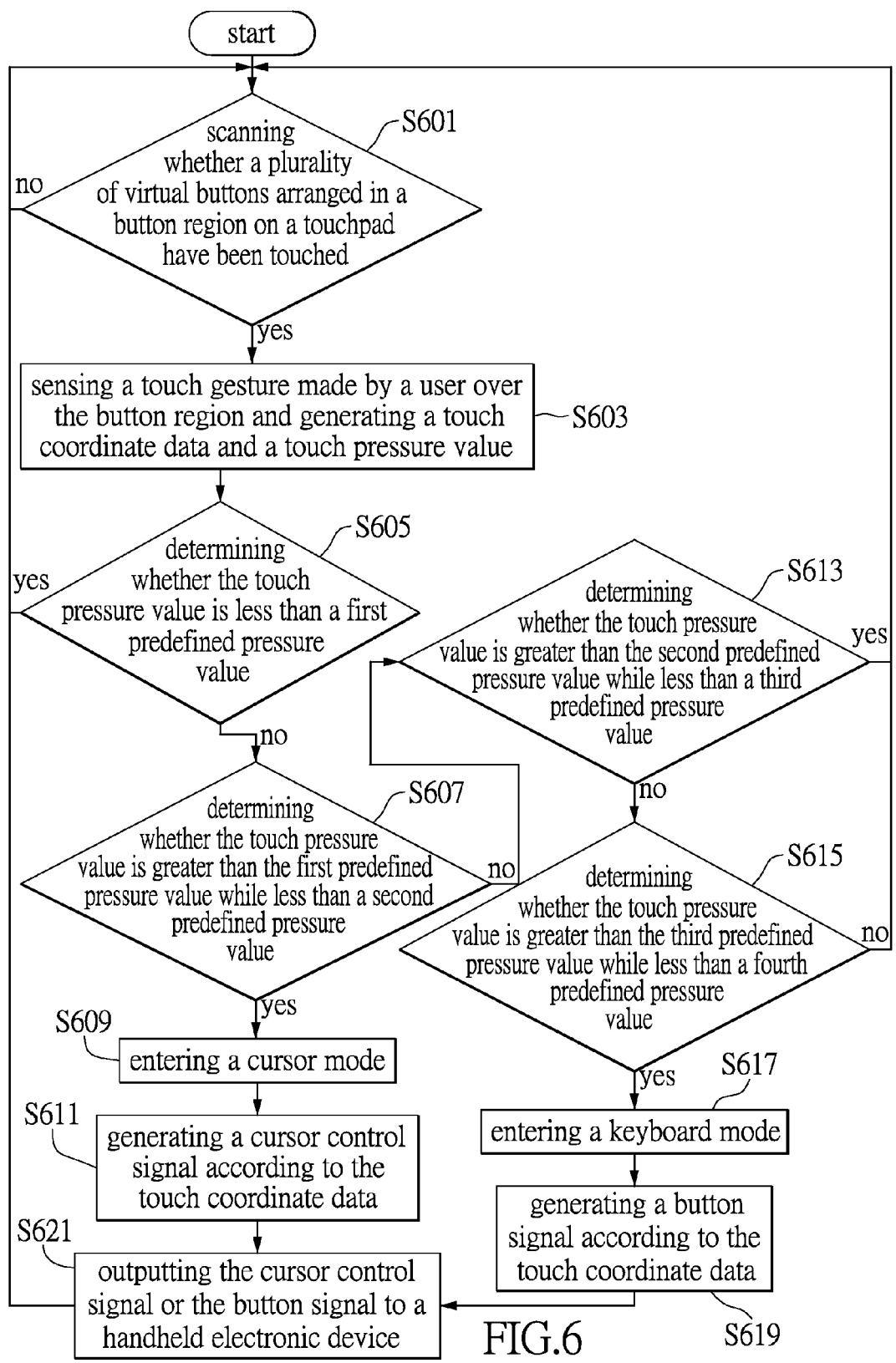
FIG. 6 is a flowchart illustrating an input mode switching method provided according to another exemplary embodiment of the instant disclosure.

Base on the aforementioned embodiment, the present disclosure may generalize another input mode switching method, which can be adapted for the aforementioned input apparatus. Please refer to FIG. 6 in conjunction with FIGS. 1B, 2A, and 2B. FIG. 6 is a flowchart illustrating an input mode switching method provided according to another exemplary embodiment of the instant disclosure.

In Step S601, the processing unit 13 drives the touchpad 11 to detect whether a plurality of virtual buttons 1101 defined in a button region 110 on the touchpad 11 have been touched. When the touchpad 11 detected that the virtual buttons 1101 defined in the button region 110 on the touchpad 11 have been touched, execute Step S603. Conversely, when the touchpad 11 detected the virtual buttons 1101 defined in the button region 110 on the touchpad 11 have not been touched, returns to Step S601.

In Step S603, the touchpad 11 senses a touch gesture made by a user over the button region 110 and generates a touch coordinate data and a touch pressure value responsive to the touch gesture. The touchpad 11 simultaneously outputs the touch coordinate data and the touch pressure value to the processing unit 13.

Next, in Step S605, the processing unit 13 determines whether the touch pressure value is less than a first predefined pressure value (e.g., 5 g). When the processing unit 13 determines that the touch pressure value is less than the first predefined pressure value, the processing unit 13 determines that the touch gesture is a false operation and does not output any signal to the handheld electronic device 2, The processing unit 13 further returns to Step S601 after determined the touch gesture is a false operation. Conversely, when the processing unit 13 determines that the touch pressure value is greater than the first predefined pressure value, executes Step S607.

In Step S607, the processing unit 13 determines whether the touch pressure value is greater than the first predefined pressure value (e.g., 5 g) while less than a second predefined pressure value (e.g., 20 g). That is, the processing unit 13 determines whether the touch pressure value lies in the touch pressure range corresponding to the touch gesture being the click gesture or the slide gesture. When the processing unit 13 determines that the touch pressure value is greater than the first predefined pressure value (e.g., 5 g) while less than the second predefined pressure value (e.g., 20 g), executes Step S609. Conversely, when the processing unit 13 determines that the touch pressure value is greater than the second predefined pressure value (e.g., 20 g), executes Step S611.

In Step S609, the processing unit 13 causes the input apparatus to enter the cursor mode. In Step S611, the processing unit 13 calculates the cursor position based on the touch coordinate data upon entering the cursor mode and generates the cursor control signal.

In Step S613, the processing unit 13 determines whether the touch pressure value is greater than the second predefined pressure value (e.g., 20 g) while less than a third predefined pressure value (e.g., 60 g). When the processing unit 13 determines that the touch pressure value is greater than the second predefined pressure value (e.g., 20 g) while less than the third predefined pressure value (e.g., 60 g), the processing unit 13 determines that the touch gesture is a false operation and does not output any signal to the handheld electronic device 2. The processing unit 13 further returns to Step S601 after determined the touch gesture is a false operation. Conversely, when the processing unit 13 determines that the touch pressure value is greater than the third predefined pressure value (e.g., 60 g), executes Step S615.

In Step S615, the processing unit 13 determines whether the touch pressure value is greater than the third predefined pressure value (e.g., 60 g) while less than the fourth predefined pressure value (e.g., 100 g) In Step S615, the processing unit 13 determines whether the touch pressure value lies in the touch pressure value range corresponding to the virtual button being pressed. When the processing unit 13 determines that the touch pressure value is greater than the third predefined pressure value (e.g., 60 g) while less than the fourth predefined pressure value (e.g., 100 g), execute Step S617. Conversely, when the processing unit 13 determines that the touch pressure value is greater than the fourth predefined pressure value (e.g., 100 g), the processing unit 13 determines that the touch gesture is the false operation and does not output any signal to the handheld electronic device 2. The processing unit 13 further returns to Step S601 after determined the touch gesture is a false operation.

In Step S617, the processing unit 13 causes the input apparatus 1 to enter the keyboard mode. In Step S619, the processing unit 13 calculates position of the virtual button based on the touch coordinate data and generates the button signal, accordingly.

Next, in Step S621, the processing unit 13 outputs the cursor control signal or the button signal to the handheld electronic device 2 via the wired or the wireless transmission to control the operation of the handheld electronic device 2.

Figure 7:
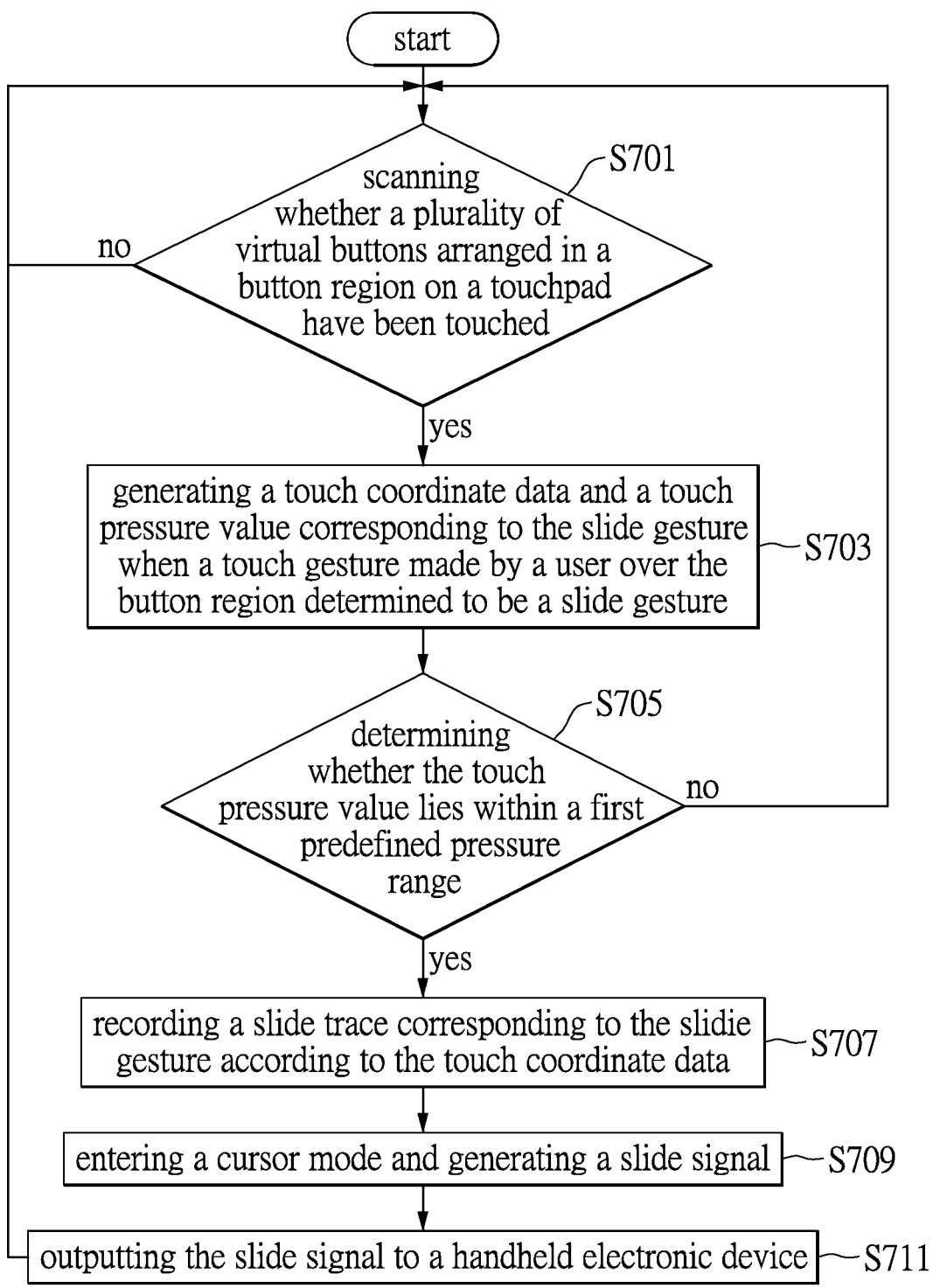
FIG. 7 is a flowchart illustrating a method for determining the slide gesture provided according to an exemplary embodiment of the instant disclosure.

Additionally, the instant embodiment further provides a method for determining a slide gesture and a method for determining a false operation. Please refer to FIG. 7 in conjunction with FIGS. 1B and 2A. FIG. 7 shows a flowchart illustrating a method for determining the slide gesture provided according to an exemplary embodiment of the instant disclosure.

In Step S701, the processing unit 13 causes the touchpad 11 to detect whether the virtual buttons 1101 defined in a button region 110 on a touchpad 11 have been touched. When the processing unit 13 detects that the virtual buttons 1101 defined in a button region 110 on a touchpad 11 have been touched, executes Step S703. Conversely, when the processing unit 13 detects that the virtual buttons 1101 defined in a button region 110 on a touchpad 11 have not been touched, returns to Step S701.

Then in Step S703, the touchpad 11 senses the touch gesture made by the user over the button region and generates the touch coordinate data and the touch pressure value responsive to the touch gesture.

Next, in Step S705, when the processing unit 13 senses that the touch gesture made by the user over the button region 110 is a slide gesture based on the touch coordinate data, the processing unit 13 determines whether the touch pressure value lies in the first predefined pressure range. For example, the processing unit 13 determines that the touch pressure value lies between 5 g and 20 g. When the processing unit 13 determines that the touch pressure value lies within the first predefined pressure range, executes Step S707. Conversely, when the processing unit 13 determines that the touch pressure value lies outside the first predefined pressure range, the processing unit 13 determines that the touch gesture is the false operation and does not output any signal to the handheld electronic device 2. The processing unit 13 further returns to Step S701 after determined the touch gesture is a false operation.

In Step S707 and S709, the processing unit 13 causes the input apparatus 1 to enter the cursor mode. At the same time, the processing unit 13 records a slide trace responsive to the slide gesture and generating a slide signal according to the touch coordinate data.

In Step S711, the processing unit 13 outputs the slide signal to the handheld electronic device 2 via wired or the wireless transmission to correspondingly control the cursor operation on the screen generated by the display unit 21 of the handheld electronic device 2.

It is worth to note that the method in FIGS. 6 and 7 can be implemented by writing the necessary firmware into the processing unit 13 of the input apparatus 1. The first predefined pressure value, the second predefined pressure value, the third predefined pressure value, and the fourth predefined pressure value, the first predefined pressure range and the second predefined pressure range can be configured according to the operational requirement of the touchpad 11 or actual pressures values generated when the user touches the buttons in the button region and can be pre-stored in the memory of the processing unit 13 via firmware writing or burning the firmware process.

It shall be noted that, FIGS. 6 and 7 merely serve to describe an implementations of the input mode switching method for the input apparatus and the operation control method for the handheld electronic device and the instant disclosure is not limited thereto.

In summary, exemplary embodiments provide an input apparatus, an input mode switching method, and a computer apparatus. The input apparatus can automatically switch and operate between the keyboard mode and the cursor mode in responsive to the keyboard gesture made by the user over the button region having virtual buttons defined therein to correspondingly control the operation of the handheld electronic device.

Additionally, the input apparatus has mechanism for determining false operation. When the input apparatus senses that the touch pressure value generated responsive to the touch gesture lies neither in the predefined pressure range associated with the keyboard operation nor in the predefined pressure range associated with the cursor control, the input apparatus operatively determines that the touch gesture is false operation and does not control the operation of the handheld electronic device.

Accordingly, the instant disclosure can automatically determine the input mode of the input apparatus based on the pressure generated responsive to the touch gesture made by the user, thereby achieve the objective of integrating the button region with the cursor control region. Accordingly, the input apparatus, the input mode switching method, and the computer apparatus can enhance the user's operating convenience while effectively reduce the area needed for implementing the input apparatus and the associated production cost.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An input apparatus, coupled to a handheld electronic device, the input apparatus comprising:
   a touchpad having a button region defined thereon, the button region having a plurality of virtual buttons defined therein, wherein the touchpad is configured for operatively sensing a touch gesture made by a user over the button region, and correspondingly generating a touch coordinate data and a touch pressure value;
   a processing unit coupled to the touchpad, and configured to operatively determine whether to cause the input apparatus to enter a keyboard mode or a cursor mode according to the touch pressure value; the processing unit having a first predefined pressure value, a second predefined pressure value and a third predefined pressure value;
   wherein, when the touch pressure value is less than the first predefined pressure value, the processing unit determines the touch gesture is a false operation; when the touch pressure value is between the first predefined pressure value and the second predefined pressure value, the processing unit causes the input apparatus to enter the cursor mode and the processing unit outputs a cursor control signal to the handheld electronic device; when the touch pressure value is between the second predefined pressure value and the third predefined pressure value, the processing unit determines the touch gesture is a false operation; when the touch pressure value is greater than the third predefined pressure value, the processing unit causes the input apparatus to enter the keyboard mode and the processing unit outputs a button signal to the handheld electronic device.

2. The input apparatus according to claim 1, wherein when the processing unit determines that the touch pressure value lies within a first predefined pressure range, the processing unit causes the input apparatus to enter the cursor mode; when the processing unit determines that the touch pressure value lies within a second predefined pressure range, the processing unit causes the input apparatus to enter the keyboard mode, wherein an upper limit of the first predefined pressure range is the second predefined pressure value; a lower limit of the second predefined pressure range is the third predefined pressure value; the second predefined pressure value is less than the third predefined pressure value.

3. The input apparatus according to claim 2, wherein the lower limit of the first predefined pressure range is 5 g while the upper limit of the first predefined pressure range is 20 g, and the lower limit of the second predefined pressure range is 60 g while the upper limit of the second predefined pressure range is 100 g.

4. The input apparatus according to claim 2, wherein the button signal comprises of one of a character signal and a function signal.

5. The input apparatus according to claim 2, wherein the cursor control signal comprises of a click signal or a slide signal; wherein when the input apparatus enters the cursor mode and the processing unit determines that the touch gesture is a click gesture, the processing unit generates the click signal according to the touch coordinate data to operatively control a cursor operation on the handheld electronic device; when the input apparatus enters the cursor mode and the processing unit determines that the touch gesture is a slide gesture, the processing unit records a slide trace according to the touch coordinate data and generates the slide signal to operatively control the cursor operation.

6. The input apparatus according to claim 2, wherein when the processing unit determines that the touch pressure value lies outside the first predefined pressure range or the second predefined pressure range, the processing unit does not output any signal to the handheld electronic device.

7. The input apparatus according to claim 1, wherein the touchpad comprises:
   a substrate;
   a first conductive layer disposed on the substrate, the first conductive layer having a plurality of first sensing regions arranged thereon;
   a pressure sensing layer disposed on the first conductive layer; and
   a second conductive layer disposed on the pressure sensing layer, the second conductive layer having a plurality of second sensing regions corresponding to the first sensing regions arranged thereon;
   wherein the first sensing regions and the second sensing regions have a plurality of sensing units defined therein, and the processing unit operatively generates the touch coordinate data and the touch pressure value corresponding to the touch gesture responsive to signals outputted from each of the sensing units.

8. The input apparatus according to claim 7, wherein the pressure sensing layer is a graphene layer.

9. A computer apparatus, comprising:
   a touchpad having a button region defined thereon, the button region having a plurality of virtual buttons defined therein, wherein the touchpad is configured for operatively sensing a touch gesture made by a user over the button region and correspondingly generating a touch coordinate data and a touch pressure value;

a handheld electronic device, comprising a processing unit coupled to the touchpad, the processing unit configured to operatively determine whether the touch coordinate data corresponds to a button signal or a cursor control signal according to the touch pressure value and whether to display a character on the handheld electronic device or to control a cursor operation on the handheld electronic device; the processing unit having a first predefined pressure value, a second predefined pressure value and a third predefined pressure value;

wherein when the touch pressure value is less than the first predefined pressure value, the processing unit determines the touch gesture is a false operation; when the touch pressure value is between the first predefined pressure value and the second predefined pressure value, the processing unit causes the handheld electronic device to enter a cursor mode; when the touch pressure value is greater than the third predefined pressure value, the processing unit causes the handheld electronic device to enter a keyboard mode.

10. The computer apparatus according to claim 9, wherein when the processing unit determines that the touch pressure value lies within a first predefined pressure range, the processing unit causes the handheld electronic device to enter a cursor mode; when the processing unit determines that the touch pressure value lies within a second predefined pressure range, the processing unit causes the handheld electronic device to enter a keyboard mode, wherein an upper limit of the first predefined pressure range is the second predefined pressure value; a lower limit of the second predefined pressure range is the third predefined pressure value; the second predefined pressure value is less than the third predefined pressure value.

11. An input mode switching method, adapted for an input apparatus, the input apparatus coupled to a handheld electronic device, the input mode switching method comprising:

scanning a plurality of virtual buttons arranged in a button region on a touchpad to sense a touch gesture made by a user over the button region;

generating a touch coordinate data and a touch pressure value corresponding to the touch gesture based on a detection result;

determining whether to cause the input apparatus to enter a keyboard mode or a cursor mode according to the touch pressure value;

predefining a first predefined pressure value, a second predefined pressure value and a third predefined pressure value;

when the input apparatus operates in the keyboard mode, the input apparatus outputs a button signal to the handheld electronic device; and when the input apparatus operates in the cursor mode, the input apparatus outputs a cursor control signal to the handheld electronic device;

wherein, when the touch pressure value is less than the first predefined pressure value, the processing unit determines the touch gesture is a false operation; when the touch pressure value is between the first predefined pressure value and the second predefined pressure value, the processing unit causes the handheld electronic device to enter a cursor mode; when the touch pressure value is greater than the third predefined pressure value, the processing unit causes the handheld electronic device to enter a keyboard mode.

12. The input mode switching method according to claim 11, wherein the step of determining whether to cause the input apparatus to enter the keyboard mode or the cursor control mode according to the touch pressure value comprises:

when the touch pressure value lies within a first predefined pressure range, causes the input apparatus to enter the cursor mode; and when the touch pressure value lies within a second predefined pressure range, causes the input apparatus to enter the keyboard mode;

wherein an upper limit of the first predefined pressure range is the second predefined pressure value; a lower limit of the second predefined pressure range is the third predefined pressure value; the second predefined pressure value is less than the third predefined pressure value.

13. The input mode switching method according to claim 12, wherein the step before scanning the virtual buttons comprises:

configuring the lower limit of the first predefined pressure range to be 5 g and the upper limit of the first predefined pressure range to be 20 g; and configuring the lower limit of the second predefined pressure range to be 60 g and the upper limit of the second predefined pressure range to be 100 g.

14. The input mode switching method according to claim 12, wherein the step of determining whether to cause the input apparatus to enter the keyboard mode or the cursor mode according to the touch pressure value further comprises:

when determined that the touch pressure value lies outside the first predefined pressure range or the second predefined pressure range, no signal is outputted to the handheld electronic device.

15. The input mode switching method according to claim 12, wherein the step after the input apparatus has entered the cursor mode comprises:

when determines that the touch gesture is a click gesture, configures the cursor control signal to be a clicking signal and correspondingly controls a cursor operation on the handheld electronic device; and when determines that the touch gesture is a slide gesture, records a slide trace according to the touch coordinate data, configures the cursor control signal to be a slide signal and correspondingly controls the cursor operation on the handheld electronic device.

16. The input mode switching method according to claim 11, wherein the step after the input apparatus has entered the keyboard mode comprises:

generating the button signal based on the touch coordinate data to cause the handheld electronic device to display a character corresponding to the virtual button touched.

* * * * *